Aug. 5, 1930.  S. J. V. BOVEY  1,772,067
VEHICLE HEATER
Filed Sept. 13, 1926  2 Sheets-Sheet 1
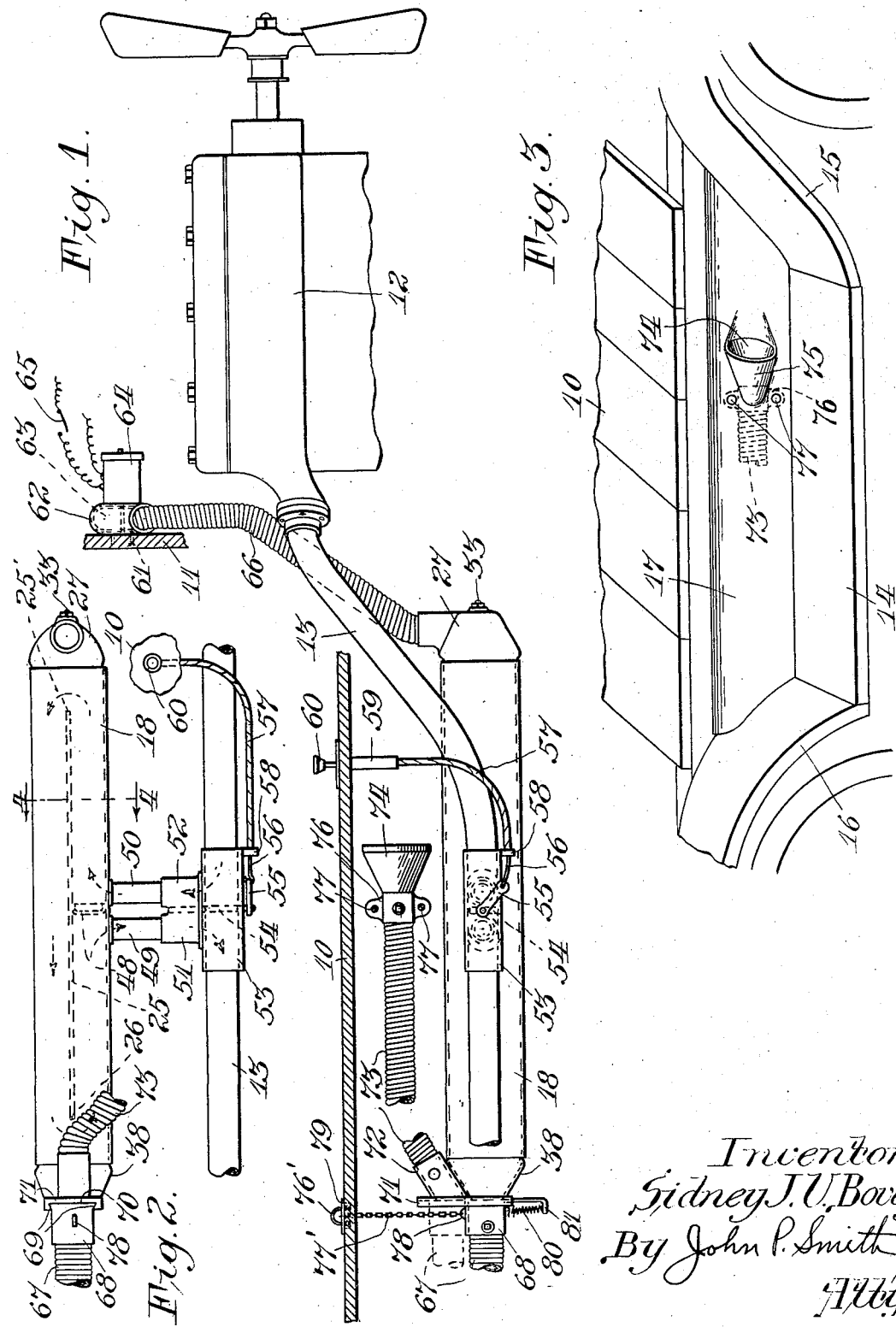
Inventor.
Sidney J. V. Bovey,
By John P. Smith
Atty.

Aug. 5, 1930.  S. J. V. BOVEY  1,772,067
VEHICLE HEATER
Filed Sept. 13, 1926  2 Sheets-Sheet 2
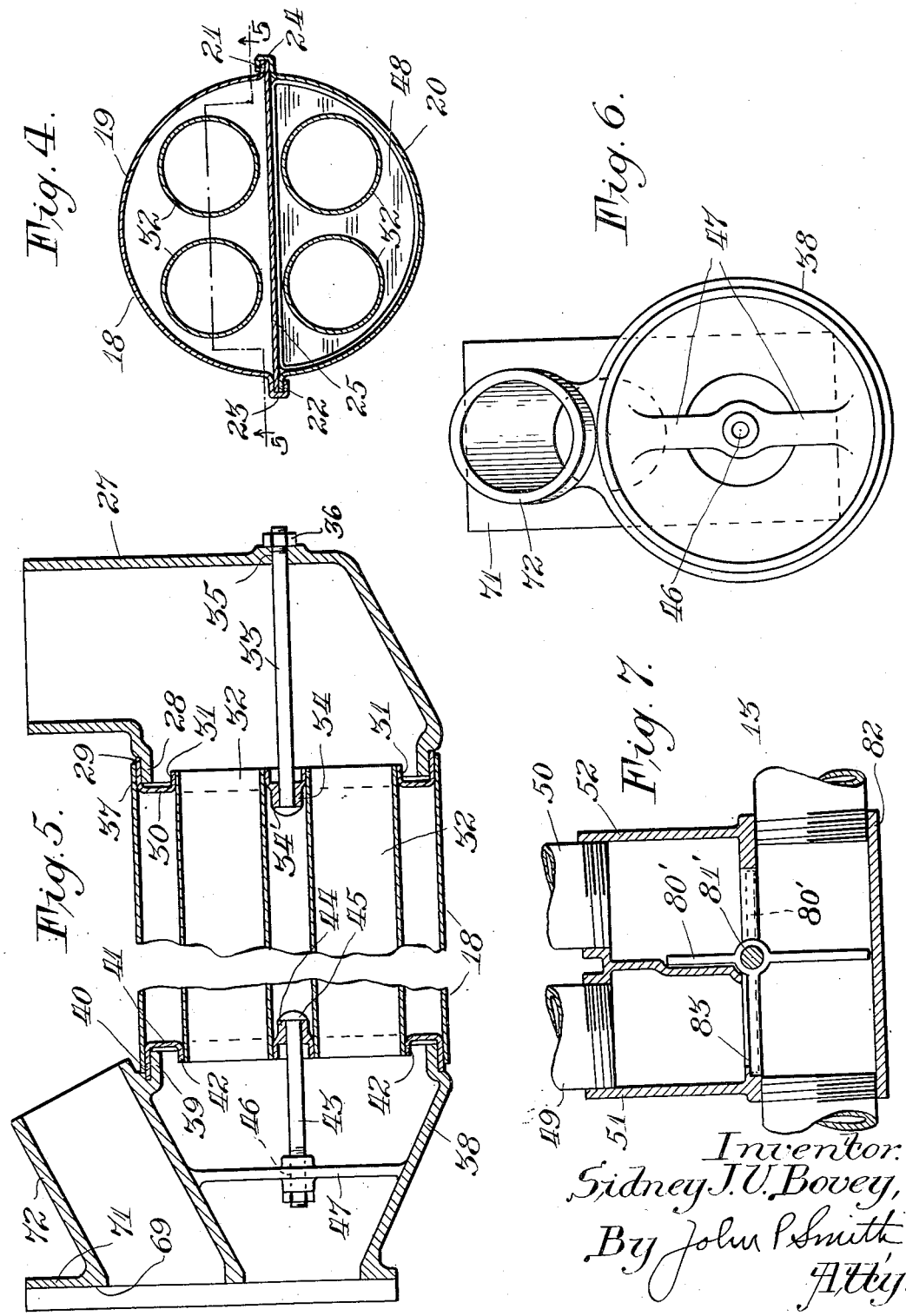

Patented Aug. 5, 1930

1,772,067

UNITED STATES PATENT OFFICE

SIDNEY J. V. BOVEY, OF CHICAGO, ILLINOIS, ASSIGNOR, BY MESNE ASSIGNMENTS, TO METALCRAFT HEATER CORPORATION, OF GRAND RAPIDS, MICHIGAN, A CORPORATION OF MICHIGAN

VEHICLE HEATER

Application filed September 13, 1926. Serial No. 134,983.

This invention relates to a combination vehicle heating and ventilating device.

One of the objects of the present invention is to provide a novel and improved device which has some of the parts thereof adapted to be utilized as a vehicle heater, and when not used as a vehicle heater is adapted to be used as a device for ventilating the enclosed body of a vehicle.

A further object of the invention is to provide a novel and improved form of a combination vehicle heater and ventilating device in which, when the device is properly adjusted so that it can be used as a ventilator for ventilating the vehicle, the heater is shut off so that the heated air will be discharged into the atmosphere.

A further object of the invention is to provide a novel form of vehicle heater in which the heater proper may be in communication with the exhaust pipe while the heated air passing through the heater is prevented from circulating through the vehicle, or, in other words, the heated air may be discharged into the atmosphere at a point adjacent one end of the heater proper without disconnecting communication between the exhaust pipe and the heater.

A still further object of the invention is to provide a novel heating and ventilating device for vehicles in which I have provided a novel means for collecting and gathering the air from a position adjacent the running board of the vehicle.

A still further object of the invention is to provide a novel construction of a vehicle heating and ventilating device in which I have provided means whereby the fresh air is furnished from outside of the vehicle body to the inside of the body, and in addition a means is provided for withdrawing the foul air from within the body and discharging it into the atmosphere.

These and further objects are accomplished by providing a construction and arrangement of the various parts in the manner hereinafter described and particularly pointed out in the appended claims.

Referring to the drawings,

Fig. 1 is a fragmentary cross sectional side elevational view of the conventional form of vehicle body and internal combustion engine, showing my improvement mounted therein.

Fig. 2 is a fragmentary top plan view of my improved form of combination vehicle heater and ventilator showing its relative position with respect to the exhaust gas pipe of the vehicle.

Fig. 3 is a fragmentary perspective view of a vehicle body showing the manner in which the air is collected from adjacent the running board of the vehicle for furnishing air to the heater or for ventilating the vehicle.

Fig. 4 is an enlarged cross sectional view taken on the line 4—4 of Fig. 2.

Fig. 5 is an enlarged cross sectional view on the line 5—5 of Figure 4 showing the manner in which the parts of the vehicle heater are connected together.

Fig. 6 is an enlarged end elevational view showing the construction of one of the end housing members, and Fig. 7 is a cross sectional view of a modified form of valve which may be used in connection with my improved vehicle heating and ventilating device.

In illustrating one embodiment of my invention, I have shown the same in connection with the conventional form of enclosed vehicle, only fragmentary parts of which are shown in the drawing. The vehicle shown in the drawing includes the usual floor board 10, dash board 11, internal combustion engine 12, and exhaust gas pipe 13 associated therewith. The vehicle in the present instance is provided with the usual running board 14, front and rear fenders 15 and 16 respectively, and running board shield 17.

My improved form of vehicle heater comprises a cylindrical casing generally referred to by reference character 18. This casing consists of two semi-cylindrical members 19 and 20. One of the longitudinal edges of each of the semi-cylindrical members 19 and 20 is bent outwardly as shown at 21 and 22 respectively, while the other longitudinal edges are provided with hook-like portions as shown at 23 and 24 respectively, so that each hook-like portion on each of the semi-cylindrical members 19 and 20 engages the corresponding or co-operative laterally extending flat portions as clearly shown in Fig. 4. Mounted between each of the semi-cylindrical casing members 19 and 20 is a flat partition wall 25, which extends across and is mounted within the hook-like portions 23 and 24, as clearly shown in Fig. 4.

When these parts are assembled in the above described manner, the hook-like portions may be seam-welded, so as to insure an air tight fit. The partition wall 25 mounted between the semi-cylindrical members 19 and 20 stops short of the cylindrical members at a point indicated by the reference characters 25' and 26, so that both chambers on either side of the partition wall are in communication with each other. The forward end of the cylindrical casing 18 is provided with an end housing member or elbow 27 which has one end thereof provided with a reduced peripheral flange 28, which telescopically receives the peripheral flange 29 of the end casing member 30. The end casing member 30 is provided with four equally spaced apart apertures which are formed by having outwardly projecting circular flanges 31. Mounted within the four circular flanges 31 of the end casing member or disc 30 are four tubes or conduits 32. The conduits are secured to the flanges 31 by welding or by other suitable means. The end housing or elbow member 27 is secured to the end casing member 30 by means of a bolt 33. The bolt 33 is secured to an inwardly projecting flange 34 formed centrally in the end casing member 30. In order to prevent the escape of exhaust gas from one chamber of the heater to the other, I preferably weld the head of the bolt 33 as shown at 34'. The threaded end of the bolt 33 extends through an aperture 35 in the elbow 27 and is provided with the nut 36 for securing the elbow or end housing member 27 in position. In order to allow for the difference in expansion and contraction of the tubes or conduits 32 with respect to the casing 18, I find it highly desirable to permit the casing 18 to be slidably connected with the peripheral flange 29 of the end casing member 30 as shown at 37.

The rear end of the cylindrical casing member 18 is provided with an end housing member 38 which forms the chamber for receiving the heated air. This housing member 38 is provided with a reduced peripheral flange 39, which telescopically receives a peripheral flange 40 formed on an end casing member 41. The end casing or disc member 41 is provided with four openings formed by flanges 42 which are adapted to receive the other end of the tubular or conduit members 32. The conduit members 32 are secured to these flanges by being seam-welded. The disc or end casing member 41 is secured to the housing 38 by a bolt 43. The bolt 43 extends through an aperture formed by an inwardly extending flange 44 formed on the disc member 41. The head 45 of the bolt 43 is preferably welded to the flange in order to prevent the exhaust gases from passing into the air chamber. The threaded end of the bolt 43 extends through an aperture 46, formed in a transverse bar 47, which in turn is formed integrally with the housing member 38. The casing member 18 telescopically receives the peripheral flange 40 of the disc or end casing member 41 and is preferably permitted to slide with respect thereto, so as to allow for the contraction or expansion of the tubes or conduits 32 with respect to the casing member 18. This construction, it will, of course, be understood, permits the contraction or expansion of these parts with respect to each other without warping, distorting or injuring the heater.

Mounted centrally of the heater casing 18 and on one side of the partition wall 25 is a transverse partition wall 48. Communicating with the compartments on each side of the transverse partition wall 48 are two separate conduits 49 and 50 which in turn communicate and connect with two spaced connection members 51 and 52. The connection members 51 and 52 in turn communicate with and are connected to a collar or sleeve 53. The sleeve 53 is adapted to telescopically receive at both ends thereof portions of the exhaust gas pipe 13. The ends of the exhaust gas pipes 13 may be secured to the sleeve 53 by any well known suitable means. Mounted within the sleeve is a valve or pivoted disc 54 to which is connected a crank 55. The crank 55 is oscillated to open or close the valve 54 by means of a reciprocal wire 56, mounted in a flexible tubing 57, one end of which is secured in a lug 58 on the sleeve 53 and the other end of which is secured in the bracket 59 mounted in the floor 10 of the car. The upper end of the wire 56 is provided with a knob 60, which in turn is located within easy reach of the operator within the vehicle. From the above description, it will be seen that when the valve is in its normal closed position or that position in which it is transverse to the longitudinal axis of the exhaust gas pipe (or in position as shown in Figs. 1 and 2) the exhaust gas will pass from the exhaust gas pipe 13 through the connecting member 52, through the conduit 50 secured to the forward side of the transverse partition wall 48, where it will pass forwardly to the end of the partition wall 25. It will then travel rearwardly to the other end of the partition wall 25 and thence forwardly to the transverse division wall 48, from where it will pass into the conduits 49 and 51 to the rear portion of the exhaust gas pipe 13. If the operator desires to prevent the exhaust gas from passing into the heater, the disc or valve 54 is actuated by means of the knob 60 to a position where it would be at right angles with respect to the position shown in Figs. 1 and 2. In this position it will, of course, be understood that the conduits leading from the exhaust gas pipe into the heater are not closed, but by opening the valve the exhaust gas passing through the exhaust gas pipe will travel in a straight path and will not go through the heater.

Another feature of the present invention is the provision of means whereby the air, to be heated, is drawn from within the car and passed through the heating element, or when it is desired to use my combination device for ventilating the vehicle I provide means for withdrawing the air from within the car and discharging it into the atmosphere. This means comprises an aperture 61 located in the dash board 11 in which is mounted a fan casing 62. The fan casing 62 is secured to the dash board in any suitable manner, and is arranged to withdraw the air from within the body of the vehicle. Mounted within the fan casing 62 is a revolving fan 63 which is operatively driven by an electric motor 64. The electric motor is connected by suitable wires to the storage battery in a manner well known and understood in the art. This motor is controlled by a conventional form of switch 65, which is preferably mounted on the instrument board of the vehicle. The lower end of the fan casing 62 is connected by flexible conduit 66 to the upper end of the elbow or end housing member 27. As the air is withdrawn from within the body of the vehicle by electric fan 63, the air is forced down through the conduit 66 into the end housing or elbow member 27, where it is forced through the tubes 32 and heated by the exhaust gases passing through the heater in the manner above described. When the air has been heated within the tubes 32 it passes into the rear end housing member 38 from where it is discharged into the conduit which connects with the register within the vehicle in the manner hereinafter described.

Another very essential feature of my improved combination heater and ventilator device comprises a novel arrangement whereby the conduit leading from the heater to the register may be operatively connected by the manipulation of a movable member, to connect the same to an air collecting device for ventilation of the vehicle. This mechanism comprises a flexible conduit 67 which communicates with the register of the vehicle body at one end and is secured to a movable collar 68 at the other end. The forward end of the collar is preferably square in cross section and is provided with an outwardly projecting dovetailed portion 69. The collar 68 is adjustably mounted in a dovetailed groove 70 formed in a vertically extending member 71, which is formed integrally with or secured to the end housing member 38. Secured to the vertically extending member 71 and preferably at an angle with respect thereto is a sleeve 72. Connected to and in communication with the forward end of the sleeve 72 is a flexible conduit 73. The forward end of the conduit 73 is provided with a funnel shaped member 74 which in turn is mounted in a conically shaped projection 75 formed in the running board guard 17 of the vehicle body. The conduit 73 and funnel shaped member 74 are secured in position by means of a bracket 76 and bolts 77. This conically shaped projection 75 formed in the running board guard 17 permits the rapid collection of air, as the vehicle is being driven forward, for ventilating the vehicle when the mechanism is adjusted in the manner described for that purpose.

When it is desired to ventilate the vehicle body and permit the heated air to be discharged in the atmosphere, the collar 68 is elevated or raised by means of a ring 76 and chain 77. The lower end of the chain 77 is connected in an eye 78 formed integrally with the collar. When the collar is raised in the dove-tailed groove 70 of the vertically extending member 71 to a position in which it registers with or communicates with the sleeve 72, the air being collected by the funnel shaped air collecting device 74, will be forced rearwardly through the conduit 73, sleeve 72, collar 68 into the conduit 67 leading to the register within the vehicle. It, of course, being understood that the chain 77 may be locked in a bracket 79 mounted in the floor of the car. In order to permit the return of the collar 68 to a position in which the heater is connected with the register of the vehicle, I have provided an extension spring 80 which has one end thereof connected to the collar 68 and the other end thereof connected to a rod 81, which in turn is secured to the vertically extending member 71.

In the modified form of valve shown in Fig. 7 which is adapted to be substituted for the one shown in Figs. 1 and 2, a tongue 80' is pivoted at 81' to valve casing 82. The casing 82 is provided with an opening therethrough of substantially the same size as the tongue 80. Surrounding the opening is a seat 83 which is adapted to receive the tongue 80 for completely closing communication between the heater and the exhaust pipe 13, when the tongue is in the dotted line position shown in Fig. 7. When the tongue is in the full line position shown in Fig. 7, one end thereof extends across the normal path of the exhaust gas passing through the exhaust gas pipe 13 and causes the gas to pass through the conduits 52 and 50 into the compartments of the heater in the manner above described.

In the operation of the above described device, it will be noted that when it is desired to use the heater, the collar 68 or movable end of the conduits 67 is adjusted to the position in full line shown in Fig. 1, and the electric switch 65 is thrown to complete the circuit, causing the motor 64 to operate the fan 63. The operation of the fan 63 withdraws the air from within the body of the vehicle through the aperture 61 in the dash board, and forces the air down through the conduit 66 into the forward or end casing member 27. From here the air is forced through the tubes 32 in which the air is heated by circulation of the exhaust gas through the heater in the manner above described. The heated air passes from the tubes into the end housing member 38, thence through the conduit 67, through the register (not shown) in the body of the vehicle. In summer time when it is desired to ventilate the car and eliminate the use of the heater, the free end of the conduit 67 may be adjusted to the dotted line position shown in Fig. 1, by elevating the chain and link 77 and 76 respectively, and securing the chain in the bracket 79 in a manner well understood. At the same time the valve 54 is adjusted through the knob 60 so that it assumes a position in which the plane of the disc 54 extends longitudinally of the axis of the exhaust gas pipe 13. When the valve is in this assumed position, the exhaust gas takes the path of least resistance and instead of passing through the connecting conduits 50 and 52 into the heater, passes straight out through the exhaust gas pipe, thereby preventing the gases from passing through the heater. When the collar 68 is adjusted to the position above described, it is then placed in communication with the sleeve 72, and air collecting and ventilating conduit 73, so that as the vehicle moves forwardly the funnel shaped air collecting device 75 mounted in the running board shield 17 collects the air and forces it through the conduit 67 and fan 63 into the register of the vehicle. At the same time, if it is found desirable to expedite the ventilating of the car, the switch 65 may be closed to drive the motor and operate the fan 63, thereby withdrawing the air from within the body of the vehicle and discharging it in the atmosphere by causing the same to pass through the tubes 32 out through the open end of the housing member 38.

From the above specification it will be readily seen that I have provided a novel form of a combination heater and ventilating device for vehicles, and one in which certain of the parts are common to both, and also one in which the electric fan may be utilized for not only assisting the heating of the vehicle but also expediting the ventilation and circulation of the car in summer time when the ventilating device is connected up in place of the heating device.

While in the above specification I have described one embodiment which my invention may assume in practice it will, of course, be understood that the same is capable of modification and that modification may be employed without departing from the spirit and scope of the invention as expressed in the following claims.

What I claim as my invention and desire to secure by Letters Patent is:

1. A heater for vehicles comprising a casing, end casing members secured to said casing, a longitudinally extending partition wall mounted in said casing having the opposite ends thereof stopping short of said end casing members so as to form substantially two chambers on the opposite sides thereof and in communication with each other, a transverse division wall dividing one of the chambers, conduits connected to the casing and in communication with the chambers on each side of said transverse division wall, longitudinally extending tubes mounted within said casing and extending through said chambers and having their opposite ends secured to said end casing members, and end housing members having chambers therein mounted in the outer ends of said casing.

2. A heater for vehicles comprising a cylindrical casing, end casing members slidably connected to said cylindrical casing, a longitudinally extending division wall dividing said casing into two semi-cylindrical compartments, said longitudinally extending partition wall stopping short of said end casing members so that each semi-cylindrical chamber communicates with the other at both ends of said casing, a transverse division wall mounted in said casing and dividing one of said semi-cylindrical chambers, conduits leading from an exhaust gas pipe and connected to the chambers on the opposite sides of said transverse division wall, a plurality of longitudinally extending tubes extending through said semi-cylindrical chambers and secured to said end casing members, end housing members having chambers therein communicating with said tubes, and bolts extending through said end housing members and having one end thereof connected to said end casing members for securing the same to said casing.

3. A vehicle heater comprising a casing made of two semi-cylindrical members, each of said semi-cylindrical members having one edge provided with a laterally extending flange and the other edge thereof provided with laterally extending hook portions, the laterally extending hooks of said semi-cylindrical members adapted to engage the corresponding laterally extending flange of the other semi-cylindrical member, a partition wall mounted between the said semi-cylindrical members, and extending into the corresponding hooks of each of said members, said partition wall stopping short of each of the ends of said semi-cylindrical members, end casing members connected to the ends of said semi-cylindrical members, a plurality of tubes extending longitudinally on the opposite sides of said longitudinally extending partition wall and secured to said end casing member, a transverse partition wall mounted on one side of said longitudinal partition wall, conduits connecting an exhaust gas pipe with chambers on the opposite sides of said transverse partition wall, end housing members having chambers therein secured to said end casing members by means of bolts, and means for connecting said semi-cylindrical casing members to said end housing members whereby said tubes may contract or expand without distorting or injuring the parts of said heater.

4. A heater for a vehicle comprising a cylindrical casing, a longitudinally extending partition wall dividing said casing in two semi-cylindrical chambers, a transverse partition wall dividing one of said semi-cylindrical chambers, end housing members mounted on the opposite ends of said casing and having chambers therein, a plurality of tubes forming the communication between said housing members and extending through the semi-cylindrical chambers in said casing, conduits communicating with an exhaust gas pipe with chambers located at the opposite sides of said transverse division wall, and a valve mounted in the path of the exhaust gas passing through said exhaust pipe, whereby the semi-cylindrical chambers in said casing are always in communication with said exhaust gas pipe whether said valve is opened or closed.

5. A heater for vehicles comprising a casing, a longitudinally extending partition wall mounted in said casing dividing said casing in two compartments and having said compartments in communication with each other at the opposite ends thereof, a transverse division wall dividing one of said compartments, conduits extending through said compartments through which air passes to be heated, conduits forming a communication between an exhaust gas pipe and chambers on the opposite sides of said transverse partition wall, a valve mounted in the path of the exhaust gas passing through said exhaust gas pipe and mounted between the conduits forming the communication between said casing and said exhaust gas pipe whereby said heater is always in communication with said exhaust gas pipe, whether the valve is opened or closed.

6. A heater for vehicles comprising a longitudinally extending casing, said casing divided into two longitudinally extending compartments by a longitudinally extending divisional wall, the opposite ends of said compartments being in communication with each other, one of said compartments being divided by a transverse division wall, conduits connecting with one of said compartments on the opposite sides of said transverse division wall, a plurality of conduits extending through said compartments for receiving air to be heated therein, and end housing members formed on the opposite ends of said casing and in communication with the conduits extending through said compartments.

7. A heater for vehicles comprising a casing, end casing members slidably connected with said casing, a longitudinally extending division wall dividing said casing into two compartments, said longitudinally extending partition wall stopping short of the ends of said casing so that each compartment communicates with the other at both ends of the casing, a transverse division wall mounted in said casing, and dividing one of said compartments, conduits leading from an exhaust gas pipe and connected to chambers on the opposite sides of said transverse division wall, a plurality of longitudinally extending conduits extending through said compartments, and end housing members having chambers therein communicating with said longitudinally extending conduits.

8. A heater for vehicles comprising a casing, a longitudinally extending partition wall mounted in said casing dividing said casing into two compartments, and having said compartments in communication with each other at the opposite ends thereof, a transverse division wall dividing one of said compartments, conduits extending through said compartments through which air passes to be heated, conduits forming a communication between an exhaust gas pipe and with one of said compartments on the opposite sides of said partition wall and means secured to the conduits extending through said compartments and slidably connected to said casing whereby said conduits may expand or contract without distorting the parts of said heater.

9. A heater for vehicles comprising a casing, end casing members secured to said casing, a longitudinally extending partition wall mounted in said casing, having the opposite ends thereof, stopping short of said end casing members so as to form substantially two chambers on the opposite sides thereof and in communication with each other, a transverse division wall dividing one of said chambers, conduits connected to the casing and in communication with the chambers on each side of said transverse division wall, longitudinally extending tubes mounted within said casing and extending through said chambers and having their opposite sides secured to said end casing members, and end housing members having chambers therein, telescopically connected to the outer ends of said casing and secured thereto by means of bolts.

10. A vehicle heater including a tubular casing, tubes within and extending longitudinally of said casing, end casing members secured to said casing at opposite ends thereof and having openings receiving opposite ends of said tubes, an elbow and an end housing member respectively having lateral portions abutting the end casing members aforesaid, and connections between said end casing members and elbow and end housing member respectively including means extending axially of the casing.

11. A vehicle heater having a tubular casing, tubes within and extending longitudinally of said casing, end casing members within and secured to said casing at opposite ends thereof and having openings receiving opposite ends of said tubes, an elbow having a lateral portion telescopically engaging a portion of one end casing member and secured to the latter, and an end housing member having a flange telescopically engaging the other end casing member and secured to the latter, the securing means aforesaid for said elbow and housing extending axially of the casing.

12. A vehicle heater having a tubular casing, tubes within and extending longitudinally of said casing, end casing members secured to said casing at opposite ends thereof and having openings receiving said tubes, a pair of tubes connected to said casing intermediate its ends at one side thereof, a partition within said casing extending longitudinally thereof in a plane at right angles to the pair aforesaid of tubes, and a partition extending transversely of said casing between the partition aforesaid and the wall to which the pair of tubes is connected, causing fluid discharged from one tube of the pair to flow longitudinally of the casing upon one side of the first-mentioned partition and thence around the end thereof longitudinally of the other side, around the opposite end of said first-mentioned partition to the other tube of the pair aforesaid.

In testimony whereof I have signed my name to this specification on this 31st day of August, A. D. 1926.

SIDNEY J. V. BOVEY.